United States Patent [19]
Odell

[11] Patent Number: 5,820,331
[45] Date of Patent: Oct. 13, 1998

[54] BATTERY CHANGING SYSTEM

[75] Inventor: Michael S. Odell, Bluefield, W. Va.

[73] Assignee: Fairchild International Inc., Glen Lyn, Va.

[21] Appl. No.: 798,150

[22] Filed: Feb. 10, 1997

[51] Int. Cl.$^6$ ....................................................... H02J 07/00
[52] U.S. Cl. ........................... 414/685; 180/685; 414/680
[58] Field of Search .................................... 414/680, 685, 414/458, 546; 180/68.5, 298

[56] References Cited

U.S. PATENT DOCUMENTS

| | | | |
|---|---|---|---|
| 5,163,537 | 11/1992 | Radev | 414/685 |
| 5,275,525 | 1/1994 | Grumblatt . | |
| 5,399,061 | 3/1995 | Grumblatt | 414/786 |
| 5,598,083 | 1/1997 | Gaskins | 414/458 |
| 5,664,932 | 9/1997 | Clonch et al. | 414/680 |

Primary Examiner—Karen M. Young
Assistant Examiner—Gregory A. Morse
Attorney, Agent, or Firm—Cushman Darby & Cushman IP Group of Pillsbury Madison & Sutro LLP

[57] ABSTRACT

A battery changing system in combination with a battery holder is provided. The battery changing system includes a mobile frame, a battery lift assembly including a pair of lifting arms forming an opening for receiving the battery holder. Mounting structure pivotally connects battery lift assembly to an end portion of the frame. Actuating structure extends between the battery lift assembly and the end portion of the frame to pivot the battery lift assembly between an initial position engaging the battery holder positioned on the ground and an operative position wherein the battery holder is raised to a selected elevation above the ground. The battery holder includes hanger structure fixed to opposing sidewalls thereof. Each hanger structure includes a rearwardly extending wall defining a rearward edge and a downwardly facing fulcrum surface disposed forwardly of the rearwardly extending wall. Each of the lifting arms includes a forwardly facing surface disposed rearwardly of a forward end thereof and an upwardly facing surface disposed forwardly of the forwardly facing surface, such that in the initial position of the battery lift assembly, the forwardly facing surfaces engage with respective rearward edges of the rearwardly extending walls to initially interrelate the lifting arms with the battery holder. Upward pivotal movement of the battery lift assembly towards the operative position thereof causes the upwardly facing surface of each lifting arm to engage the downwardly facing fulcrum surface of the associated hanger structure permitting the battery holder to be stably moved with the mobile frame.

12 Claims, 4 Drawing Sheets

BATTERY CHANGING SYSTEM

BACKGROUND OF THE INVENTION

This invention relates to a system for moving a battery into and out of vehicles and equipment for use in underground mines, and more particularly, to an apparatus and method for lifting a battery holder or box containing an electric battery from ground level to an elevated position so as to transport the battery holder.

In underground mining operations, it is typical to provide electrically driven vehicles and electrically operated equipment with batteries as the electrical power supply. After a period of use, a spent battery must be replaced with a charged battery at the place of operation.

Battery changing systems for use in underground mines typically include a mobile vehicle having a low profile which is adapted for use in low overhead subterranean locations such as mine shafts. Electric motors are provided to propel the vehicle. The motors are powered by electric storage batteries which include a plurality of battery cells of substantial size and weight. Generally, these batteries are disposed in boxes which are supported in compartments built into the frame of the vehicle. Batteries contained in the boxes are electrically connected to the vehicle drive and control mechanisms. Since the batteries on the vehicle must be replaced when the electrical charge falls below the minimum required to supply the necessary power to the vehicles, typically, lift arms are pivotally mounted on the frame of the vehicle to lift the battery boxes out from the vehicle onto the ground where the lift arms are then disengaged. Spent batteries are then replaced with charged batteries contained in another holder, which is connected to the lift arms. The lift arms are raised so as to insert the charged batteries in the holder into the battery compartment.

A need exists to provide an improved battery changing system and apparatus that is suitable for use in underground mines where limited lateral and overhead clearance is available for movement of the battery holder into an operative position.

SUMMARY OF THE INVENTION

It is an object of the invention to provide a battery changing system to fulfill the need referred to above. In accordance with the principles of the present invention, this objective is obtained by providing a battery changing system in combination with a battery holder. The battery changing system comprises a mobile frame, a battery lift assembly including a pair of lifting arms extending in spaced relation so as to form an opening for receiving the battery holder, mounting structure constructed and arranged to pivotally connect the battery lift assembly to an end portion of the frame, and actuating structure extending between the battery lift assembly and the end portion of the frame.

The actuating structure is constructed and arranged to pivot the battery lift assembly between an initial position engaging the battery holder positioned on the ground and an operative position wherein the battery holder is raised to a selected elevation above the ground.

The battery holder is constructed and arranged to be received in the opening and includes hanger structure fixed to opposing sidewalls thereof. Each of the hanger structures include a rearwardly extending wall defining a rearward edge and a downwardly facing fulcrum surface disposed forwardly of the rearwardly extending wall. The battery holder also includes engaging structure at a lower rearward portion thereof.

Each of the lifting arms includes a forwardly facing surface disposed rearwardly of a forward end thereof, an upwardly facing surface disposed forwardly of the forwardly facing surface, and downwardly facing surface on a rearward portion thereof, such that in the initial position of the battery lift assembly, the forwardly facing surfaces engage with respective rearward edges of the rearwardly extending walls to initially interrelate the lifting arms with the battery holder. Upward pivotal movement of the battery lift assembly towards the operative position thereof causes the upwardly facing surface of each lifting arm to engage the downwardly facing fulcrum surface of the associated hanger structure and causes the downwardly facing surfaces of the lifting arms to engage with the engaging structure, thereby permitting the battery holder to be stably moved with the mobile frame.

Other objects, features and characteristics of the present invention, as well as the methods of operation and the functions of the related elements of the structure, and the combination of the parts and economics of manufacture, will become more apparent upon consideration of the following detailed description and appended claims with reference to the accompanying drawings, all of which form a part of this specification.

DETAILED DESCRIPTION OF THE PREFERRED EMBODIMENT

Figure 1:
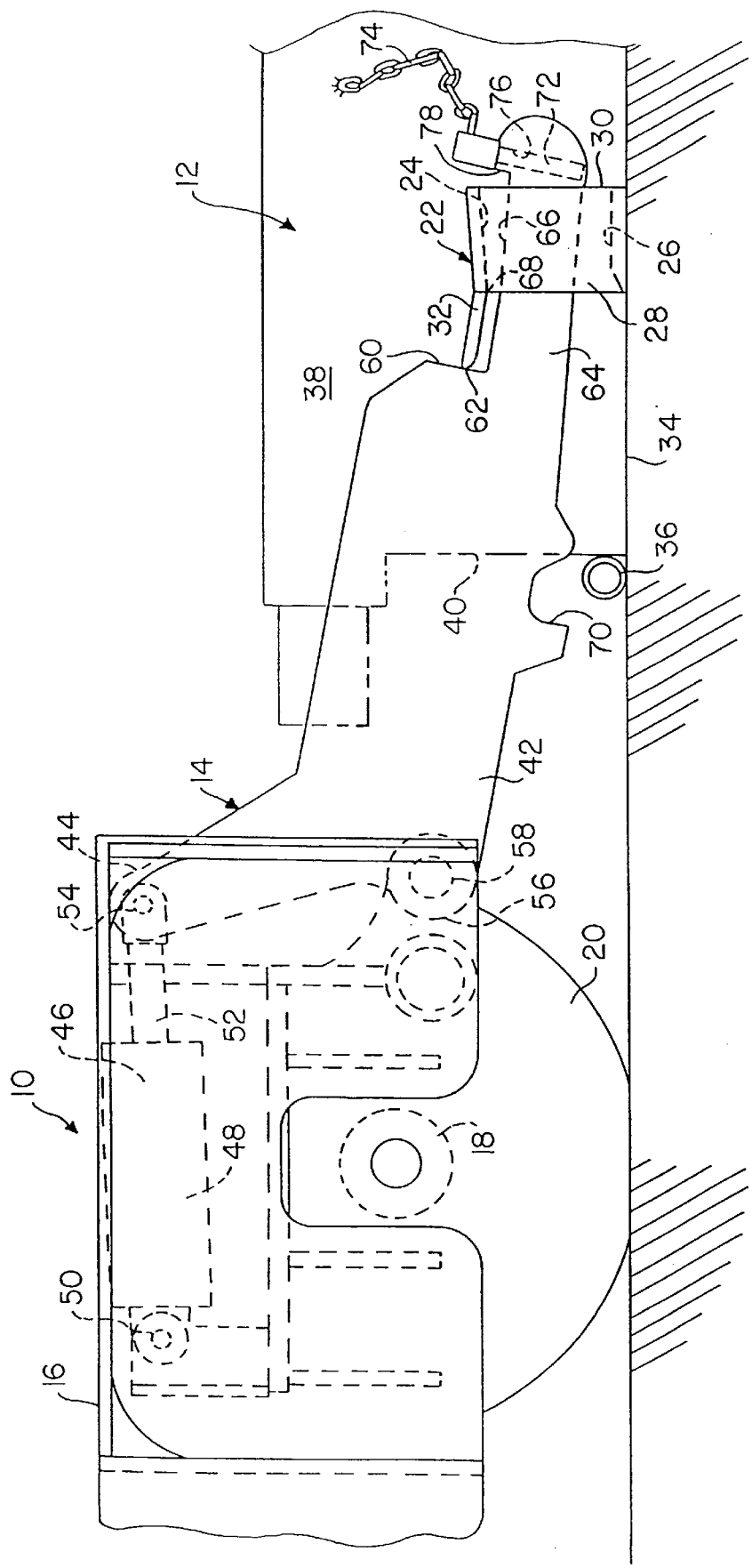
FIG. 1 is a schematic illustration in side elevation of a rear portion of a vehicle, illustrating a battery changing system provided in accordance with the principles of the present invention, shown in a tilted downward position so as to engage a battery holder positioned on the ground.

Referring to the drawings, there is shown a rear portion of a battery changing system in the form of a mobile vehicle, generally indicated at 10, for transporting an electrical storage battery (not shown) in a battery holder, generally indicated at 12. The vehicle may be, for example, of the type such as disclosed in U.S. Pat. No. 5,275,525, the content of which is hereby incorporated into the present specification by reference. The vehicle 10 includes a lift system, generally indicated at 14, which is pivotally mounted to the rear portion of the vehicle 10. Vehicle 10 is adapted for use in underground mining operations and the like where overhead and lateral clearance for raising and lowering the battery holder by the lift system 14 is minimal. The vehicle 10 includes a frame 16 mounted on an axle assembly 18 which drives wheels 20 through a conventional transmission (not shown).

The vehicle 10 may be provided with drive structure (not shown) for driving or propelling the vehicle, such as an electrically-powered drive motor connected to the storage battery positioned in the holder 12. It can be appreciated, however, that the vehicle 10 may be of the type to be pulled or towed by another vehicle which would receive electric power from the battery in the battery holder 12. The battery holder 12 has a box-like configuration and is constructed and arranged to receive and support a large electrical storage battery which may comprise a plurality of cell units. The battery has a capacity to supply electrical power to machinery for a selected period of time.

Figure 4:
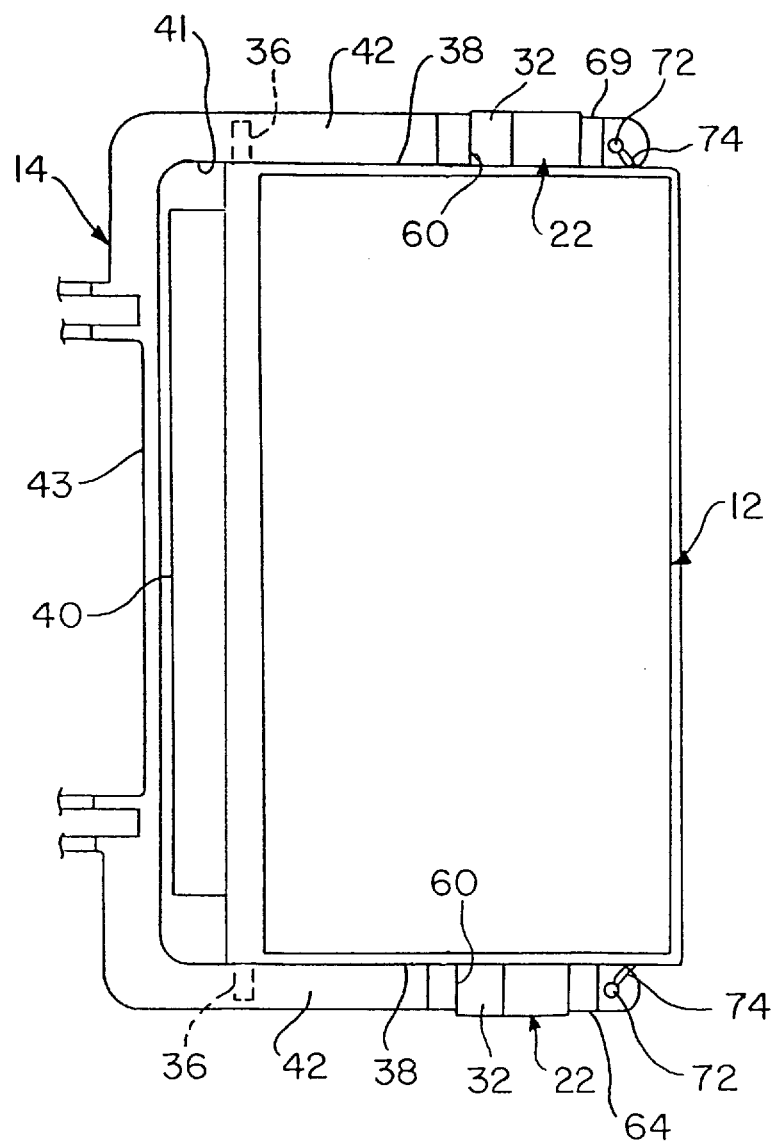
FIG. 4 is a schematic plan view of the lift assembly of the invention shown in an operative position with respect to a battery holder.

With reference to FIGS. 1 and 4, hanger structure in the form of a generally U-shaped hanger 22 is fixed to each side wall 38 of the battery holder 12. Each U-shaped hanger 22 is identical and includes an upper wall 24, a lower wall 26, and a connecting wall 28 joining the upper and lower walls so as to define a channel 30 between a side walls 38 of the battery holder 12 and the inner surfaces of the upper wall 24, lower wall 26 and connecting wall 28. An inclined wall 32 extends at an angle rearwardly from the upper wall 24 of each U-shaped hanger 22. Further, the underside of the upper wall 24 of each U-shaped hanger 22 inclines in a direction opposite the inclined wall 32, the function of which will become apparent below.

As shown in FIGS. 1 and 4, a rearward portion 40 of the battery holder 12 adjacent the lower surface 34 thereof includes a tubular projection 36, defining engaging structure, fixed thereto by welding or the like so as to extend outwardly beyond the extent of the side walls 38. The tubular projection 36 may extend the entire width of the battery holder 12, or it may be composed as two parts, each of which extends past the side walls 38 of the holder 12 so as to cooperate with each lift arm of the lift assembly 14, as will be explained below.

The lift assembly 14 includes a generally U-shaped frame of the type disclosed, for example, in U.S. Pat. No. 5,275,525, defining a configuration that is adapted to surround in close conformity to lateral side walls 38 and rear portion of the battery holder 12. Thus, as shown in FIG. 4, the lift assembly 14 includes a pair of lifting arms 42 disposed in spaced relation defining an opening 41 therebetween for receiving the battery holder 12. The arms 42 are connected to a support 43 to define the U-shaped frame. The arms 42 extend symmetrically about a longitudinal axis of the vehicle frame. It can be appreciated that the lifting arms 42 are constructed and arranged to provide sufficient rigidity to support the weight of the storage battery positioned in the battery holder 12.

The upper end portions 44 of each lifting arm 42 are connected to an associated piston-cylinder assembly, generally indicated at 46. Each piston-cylinder assembly 46 defines actuating structure and includes a cylinder 48 which is pivotally connected to a sidewall of the vehicle frame at connection 50. Each piston-cylinder assembly 46 also includes an extensible piston rod 52 which is mounted within the cylinder 48 so as to extend and retract upon actuation of the piston-cylinder assembly 46. Each piston rod 52 is connected by a pin connection 54 to the upper end 44 of the associated lift arm 42. A lower portion 56 of each lifting arm 42 is pivotally connected to the vehicle frame 16 via pin connection 58, the function of which will become apparent below. The pin connections 54 and 58 define mounting structure for pivotally connecting the lift assembly 14 to the frame 16.

Figure 2:
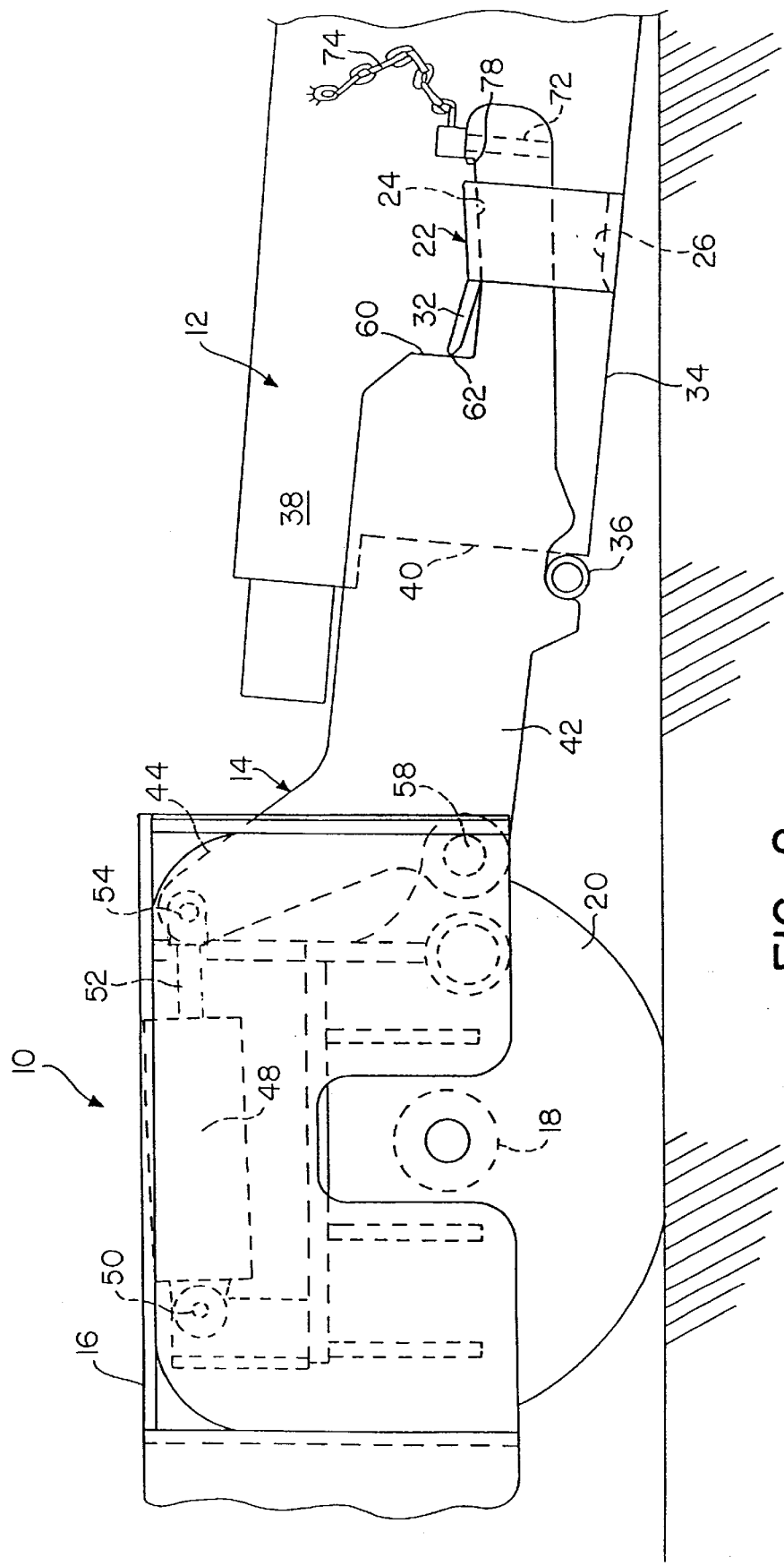
FIG. 2 is a view similar to FIG. 1, illustrating the initial lifting movement of the battery holder from the ground.
Figure 3:
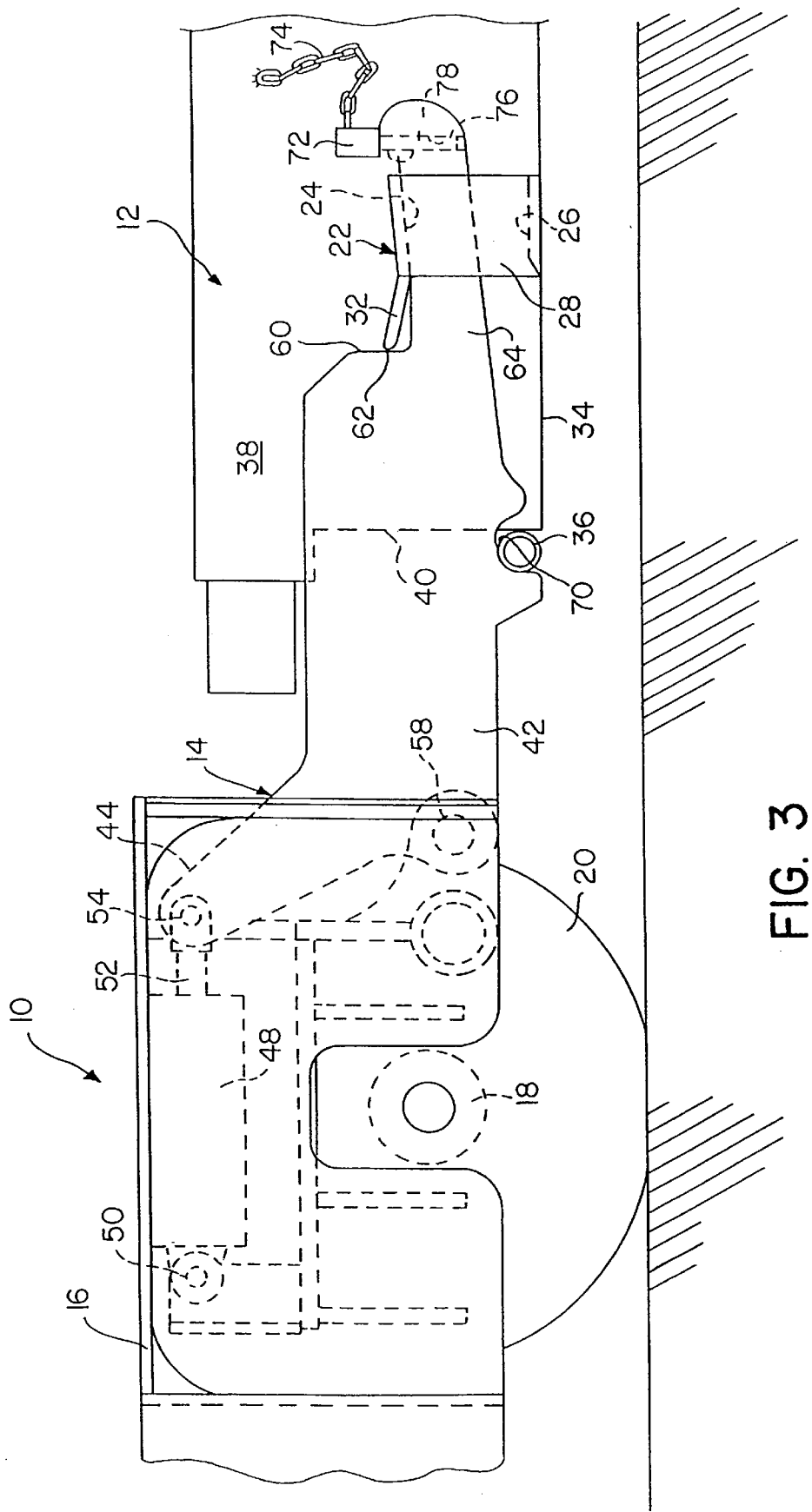
FIG. 3 is a view similar to FIGS. 1 and 2 illustrating the battery holder raised by a lift assembly from the ground to an operating position.

As shown in FIGS. 2 and 3, each lifting arm 42 includes a forwardly facing surface 60 disposed rearwardly of the forward end thereof, which is provided for engaging a rearward edge 62 of the inclined or rearwardly extending wall 32 of each U-shaped hanger 22. Disposed forwardly of the forwardly facing surface 60 is an elongated member 64 which is constructed and arranged to be received within the channel 30 defined by the U-shaped hanger 22. As best shown in FIG. 1, upon extension of the piston rods 52 from the cylinders 48, the arms 42 are pivoted about their lower connections 58 away from the vehicle frame 16 so as to lower the lift assembly 14. The vehicle is then advanced to a position such that the elongated members 64 are received in the channels 30 of the U-shaped hangers 22 and each forwardly facing surface 60 is engaged with the rearward edge 62 of the associated inclined wall 32. This engagement initially interrelates the lift arms 42 with the battery holder 12 in a predetermined position so that there will be no sliding movement taking place during the lifting of the arms 42.

Once in this position, the pistoncylinder assemblies 46 are actuated so as to retract the piston rods 52 into the cylinders 48 which pivots the arms 42 about the lower connections 58 towards the vehicle frame 16. Upward pivotal movement of the lifting arms 42 causes the upper surface 66 of each elongated member 64 to engage a fulcrum edge 68 defined by the upper wall 24 of each U-shaped hanger 22. The position in which the fulcrum edge 68 engages the lift arms 42 is the same as the lift arms 42 continue to raise. However, a relative tilting movement between each upper wall 24 of the U-shaped hanger 22 and each lift arm 42 will take place until the downwardly-facing engaging surface of each upper wall of the U-shaped hangers engages the adjacent surface of each lift arm 42. When this occurs, the tubular projection 36 at the lower portion of the battery holder 12 engages with a downwardly facing surface defined by a generally U-shaped recess 70 in the lower rearward portion of each of the lifting arms 42. Further upward movement of the lifting assembly 14 (further retraction of the piston rods 52) simply results in the entire battery holder 12 being pivoted upwardly in a fixed relationship with respect to the lifting arms 42 until the lifting arms reach the operative position shown in FIG. 3.

As shown in FIGS. 1–3, once the elongated members 64 are disposed through the channels 30 of associated U-shaped hanger 22, the holder 12 can be locked with respect to the lifting arms via a pin connection. Thus, pin 72 is secured via a chain 74 or the like to each side wall 38 of the battery holder 12. A bore 76 is defined in the forward end of each elongated member 64 so as to receive a pin 72.

In addition, each of the elongated members 64 terminates in a flange end defining a stop surface 78. With reference to FIG. 3, it can be appreciated that when the lift assembly 14 is in the operative position thereof, forward movement of holder 12 with respect to the arms 42 is limited since a portion of the U-shaped hanger will engage with the stop surfaces 78.

The lift assembly 14 is mounted on the vehicle frame 16 so as to raise and lower the battery holder 12 within the dimensional limits of the low profile of the vehicle frame 16. Thus, as shown in FIG. 3, in the operating position, the lift assembly 14 carries the battery holder 12 such that the top of battery holder 12 does not exceed the height dimension or the width dimensions of the low profile vehicle 10. With the compact construction of the holder 12 and the vehicle 10, the vehicle 10 with the lift assembly 14 and the battery holder 12 may be maneuvered within a mine to exchange batteries at any location in the mine where maneuverability is possible.

While the invention has been described in connection with what is presently considered to be the most practical and preferred embodiment, it is understood that the invention is not limited to the disclosed embodiment, but, on the contrary, is intended to cover various modifications and equivalent arrangements included within the spirit and scope of the appended claims.

What is claimed is:

1. A battery changing system in combination with a battery holder, the battery changing system comprising:

a mobile frame, a battery lift assembly including a pair of lifting arms extending in spaced relation so as to form an opening for receiving the battery holder, mounting structure constructed and arranged to pivotally connect said battery lift assembly to an end portion of said frame, and actuating structure extending between said battery lift assembly and said end portion of said frame, said actuating structure being constructed and arranged to pivot said battery lift assembly between an initial position engaging the battery holder positioned on the ground and an operative position wherein the battery holder is raised to a selected elevation above the ground, said battery holder being constructed and arranged to be received in said opening and including hanger structures fixed to opposing sidewalls thereof, each of said hanger structures including a rearwardly extending wall defining a rearward edge, and a downwardly facing engaging surface disposed forwardly of said rearwardly extending wall, said downwardly facing engaging surface having a fulcrum edge, said battery holder including engaging structure at a lower rearward portion thereof, each of said lifting arms including a forwardly facing surface disposed rearwardly of a forward end thereof, an upwardly facing surface disposed forwardly of the forwardly facing surface and a downwardly facing surface on a rearward portion thereof, such that in said initial position of said battery lift assembly, said forwardly facing surfaces engage with respective rearward edges of said rearwardly extending walls to initially interrelate said lifting arms with said battery holder, upward pivotal movement of said battery lift assembly towards the operative position thereof causes the upwardly facing surfaces of said lifting arms to engage the fulcrum edges of said hanger structures so that said battery holder is tilted relative to said upwardly facing surfaces of said lifting arms about said fulcrum edges until said upwardly facing surfaces of said lifting arms are engaged with the downwardly facing engaging surfaces of said hanger structures and the downwardly facing surfaces of the lifting arms are engaged with the engaging structure of said battery holder, thereby permitting the battery holder to be stably moved with the mobile frame.

2. The combination according to claim 1, wherein each of said rearwardly extending walls extends at an upward inclination with respect to an upper wall of an associated hanger structure.

3. The combination according to claim 2, wherein each of said hanger structures is a generally U-shaped hanger having said upper wall, a lower wall and a connecting wall joining the upper and lower walls thereby defining a channel between a side wall of the battery holder and the U-shaped hanger, a rearward edge of said upper wall defines said fulcrum edge and a downwardly facing surface of said upper wall defining said downwardly facing engaging surface.

4. The combination according to claim 3, wherein each of said lifting arms includes an elongated member, an upper surface of each elongated member defining said upwardly facing surface of each said lifting arm.

5. The combination according to claim 4, wherein said battery holder includes a locking pin mounted to a side wall thereof and at least one of said elongated members includes a bore therein sized and configured to receive the locking pin for securing the battery holder with respect to the lift assembly.

6. The combination according to claim 4, wherein each of said elongated members terminates in a flange end defining a stop surface, said flange end being constructed and arranged such that when said lift assembly is in the operative position thereof, forward movement of said holder with respect to said arms is limited as the forwardly extending walls of said hangers engage with associated stop surfaces.

7. The combination according to claim 2, wherein said downwardly facing engaging surface inclines in a direction opposite a direction of inclination of said rearwardly extending wall.

8. The combination according to claim 1, wherein said engaging structure includes a tubular member fixed to said lower rearward portion of the battery holder and extending beyond an extent of said sidewalls of said battery holder.

9. The combination according to claim 8, wherein each of said downwardly facing surfaces of said lifting arms is defined by a generally U-shaped recess.

10. The combination according to claim 1, wherein said actuating structure includes a piston-cylinder assembly constructed and arranged with respect to said lift assembly to generate pivotal movement of said lift assembly about said mounting structure.

11. The combination according to claim 1, wherein said mounting structure includes pin connections between said frame and said lift assembly.

12. A battery changing system in combination with a battery holder, the battery changing system comprising:

a mobile frame, a battery lift assembly including a pair of lifting arms extending in spaced relation so as to form an opening for receiving the battery holder, mounting structure constructed and arranged to pivotally connect said battery lift assembly to an end portion of said frame, and actuating structure extending between said battery lift assembly and said end portion of said frame, said actuating structure being constructed and arranged to pivot said battery lift assembly between an initial position engaging the battery holder positioned on the ground and an operative position wherein the battery holder is raised to a selected elevation above the ground, said battery holder being constructed and arranged to be received in said opening and including hanger structures fixed to opposing sidewalls thereof so as to define a channel sized to receive a forward end of said lifting arms, each of said hanger structures including a rearwardly extending wall defining a rearward edge, and a downwardly facing engaging surface disposed forwardly of said rearwardly extending wall, said downwardly facing surface having a fulcrum edge, said battery holder including engaging structure at a lower rearward portion thereof, each of said lifting arms including a forwardly facing surface disposed rearwardly of a forward end thereof, an upwardly facing surface disposed forwardly of the forwardly facing surface, and a downwardly facing surface on a rearward portion thereof, such that in said initial position of said battery lift assembly, said forwardly facing surfaces engage with respective rearward edges of said rearwardly extending walls to initially interrelate said lifting arms with said battery holder, upward pivotal movement of said battery lift assembly towards the operative position thereof causes the upwardly facing surfaces of said lifting arms disposed within said channels defined by said hanger structures to engage the fulcrum edges of the hanger structures so that said battery holder is tilted relative to said upwardly facing surfaces of said lifting arms about said fulcrum edges until said upwardly facing surfaces of said lifting arms are engaged with the downwardly facing surfaces of said hanger structures and the downwardly facing surfaces of the lifting arms are engaged with the engaging structure of said battery holder, thereby permitting the battery holder to be stably moved with the mobile frame.

\* \* \* \* \*